Jan. 29, 1963 P. J. TAMMINEN 3,076,052
METHOD USED IN THE MANUFACTURE OF GALVANIC BATTERIES
Filed Nov. 18, 1959

INVENTOR.
PENTTI JUUSE TAMMINEN
BY Albert M. Parker
ATTORNEY.

3,076,052
METHOD USED IN THE MANUFACTURE OF
GALVANIC BATTERIES
Pentti Juuse Tamminen, Otaniemi, Otakallio, Finland, assignor to Oy. Airam AB., Helsinki, Finland, a company of Finland
Filed Nov. 18, 1959, Ser. No. 853,946
Claims priority, application Sweden Nov. 19, 1958
3 Claims. (Cl. 136—175)

In the British Patent No. 779,033 a galvanic battery is disclosed formed of a number of superposed flat cell elements, each cell element having at least one integument member which during isolation of the cell is contacted by a molten substance used for coating the exposed exterior surfaces of the cell, the integument members being capable of absorbing or being soluble in the said isolation substance.

Said British patent further includes a method for the production of a galvanic battery which comprises forming cells of a number of superposed flat cell elements with at least one integument member therebetween, arranging several cells in juxtaposition under pressure to form a unitary assembly, isolating the whole battery at one time so that the exposed parts of the integument member or members contact a molten isolation substance whereby parts of said integument member or members are dissolved in, or absorb part of, said isolation substance.

This method is primarily intended for application to batteries fitted with duplex electrodes, which consist of a zinc plate on one side of which there is a coating of carbon. In this case, the integument members according to the patent are fitted at least between the zinc electrodes and the electrolyte colloids adjacent to them. Said members are characterized by being of porous paper soaked in electrolytic colloid.

Recently, however, duplex electrodes have been developed in which the zinc electrode is fitted with an electrolyte plate firmly attached to it. One way of achieving this is to furnish the known electrolyte plate of porous paper with a coating of hygroscopic binding substance so that the plate sticks to the electrode. Another way is to cover the electrode with a coating of lacquer or similar substance containing particles of electrolyte substance.

This invention relates to a method for production of galvanic batteries in which there are electrodes of the type mentioned above. The principal characteristic of this invention is that an integument member of porous material that absorbs the insulation substance or dissolves in it is fitted, during assembly, at least to one side of each electrolyte plate, i.e. to the side that bears the coating of electrolyte, between said coating and the adjacent depolarizer cake.

If the electrolyte plate firmly fastened to the electrode plate is of porous paper, its outer surface will be substantially dry, the moisture being contained in the hygroscopic binding layer next to the electrode plate. During the assembly of the battery, an integument member of porous paper, for instance, is placed against the electrolyte coating. When the battery is dipped in molten insulation substance, the insulation substance soaks into the integument member and a very tight joint is created between the integument member and the electrolyte plate, thus effectively insulating the cells from each other. Thanks to the capillary action of the integument member, the molten insulation substance sticks to the dry surface of the electrolyte plate and can even penetrate into it to some extent. As long as the temperature of the molten insulation substance is kept high enough, any moisture on the edge of the electrode plate is evaporated and the insulation substance sticks firmly to the edge of the electrode plate. This effectively prevents leakage.

If lacquer-type electrode coating is used, the insulating substance cannot penetrate it, but here also, two dry elements—the integument member and the electrode coating—come opposite each other and, thanks to the capillary action of the integument member, a tight joint is obtained between the latter, the electrolyte coating and the insulation substance, thus ensuring the desired insulation of the cells from one another.

When integument members of a material soluble in the insulating substance is used, the latter is not absorbed in them, but the edges of the members dissolve in it and thus produce the same effect as above.

The invention will now be described more in detail with reference to the accompanying drawing, which illustrates by way of example a battery embodying the invention.

Figure 1:
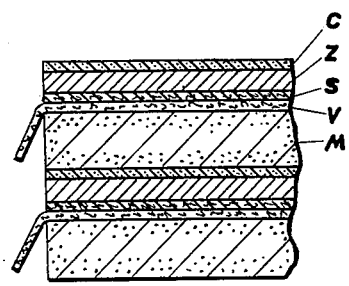
FIG. 1 is a fragmentary sectional view of an assembled unisolated battery.

In the drawing the reference letter C designates a carbon electrode, Z a zinc electrode, S an electrolyte-containing layer, M a depolarizing cake and V an integument sheet according to the invention. One surface of the zinc electrode is coated with the carbon layer C and the other surface with the electrolyte-containing layer S, which in the embodiment shown consists of paper impregnated with electrolyte, so that the said members form a single unit.

Figure 2:
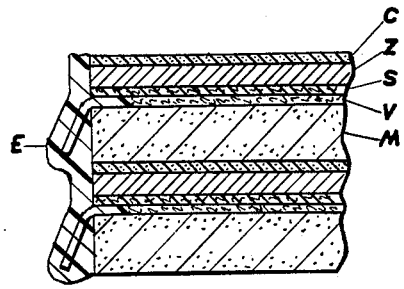
FIG. 2 illustrates a battery according to FIG. 1 with isolation.

The integument sheet V positioned between the electrolyte layer S and the depolarizing cake M is, according to the invention, made advantageously of thin porous material, e.g. paper. This integument sheet may be so dimensioned the same on all sides extends over the edges of the electrode elements, as is shown in the drawing, or so the same is as great as the electrode element. The part of the integument sheet disposed within the battery may either be compact or provided with one or more openings for facilitating passage therethrough of the electrolyte, as indicated with dotted lines in FIG. 3. When the battery is dipped in the bath of molten isolation compound the same will impregnate the edges of the integument sheet so the surface of the electrode element will be effectively encircled by a peripheral border of isolation compound. This fact will become evident from FIG. 2 wherein E designates the isolation layer. Study of this figure will show that the isolation compound penetrates into the battery along the porous integument sheet V. Into the electrolyte-containing element S impregnated with salts and other matter necessary for the electrolyte the isolation compound is incapable of penetrating to any notable degree nor into the depolarizing cake M. The isolation compound will adhere fairly well to the electrode element Z—C—S because of the capillary action of the integument sheet. In this way the electrolyte colloids are prevented from oozing to the edges of the zinc electrodes, which fact to a high degree serves to reduce short-circuiting risks and to improve storage fitness.

Figure 3:
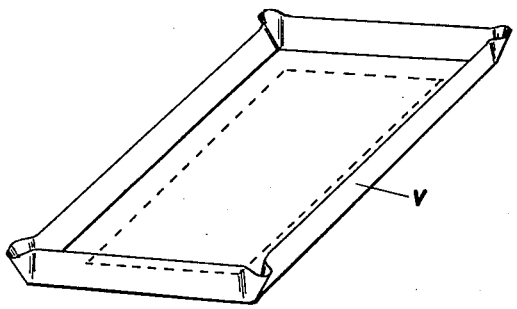
FIG. 3 is a perspective view of one form of the integument sheet.

On employing integument sheets larger in size than the electrode elements the sheets are folded, advantageously beforehand, as shown in FIG. 3 which step serves to facilitate assemblage of the battery.

As has hereinbefore been mentioned the integument sheets may also be made of matter soluble in the molten isolation compound. Integument sheets of polyethylene are mentioned by way of example to be used in connection with an isolation compound comprizing a mixture of polyethylene and paraffin. Upon isolating the battery by dipping the same in the molten isolation compound the edges of the integument sheet will dissolve in the isolation compound and form together therewith a compact and continuous isolating layer. It is to be understood that in this case the integument sheet must be provided with one or more openings for passage of the electrolyte.

The isolation compound must be pervious to hydrogen gas but impervious to water vapor. In addition the isolation compound must be water-repellent and to some degree elastic so the same will not rupture when battery volume increases during discharge, and moreover, the same should be such as to absorb effectively into the integument sheets. For the objects of the invention a preferred isolation compound consists of a mixture of 10% polyethylene and 90% paraffin. Naturally, other isolation compounds or mixtures which fulfill the stated requirements may be used.

What I claim is:

1. In the production of galvanic batteries of the flat cell type formed of a plurality of cells wherein isolation of the individual cells is effected by a coating employing an insulation compound pervious to hydrogen gas but impervious to water vapor and wherein each cell includes a cell element and an electrode element, said electrode element consisting of a zinc plate coated on one side by a carbon layer and on the other side by a dry electrolyte containing layer, the method which comprises assembling an integument sheet of a porous material absorbent with respect to said insulation compound on the side of said electrode element which bears said electrolyte layer, between said layer and said cell element, assembling a plurality of said cells in a stack to form a battery, insulating the whole battery at one time by dipping the same in a bath of molten insulation compound pervious to hydrogen gas but impervious to water vapor and bringing said integument members into contact with said compound and absorbing portions of said integument members in said compound and tightly joining said integument sheets in said stack with the said electrolyte containing layers immediately adjacent thereto.

2. The method as in claim 1 and including impregnating said bordering portions of said integument sheets by said compound by absorbing the same therein.

3. The method as in claim 1 and including, dissolving said bordering portions of said integument sheets by said compound while absorbing the same therein.

References Cited in the file of this patent

UNITED STATES PATENTS

| | | |
|---|---|---|
| 2,626,295 | MacFarland | Jan. 20, 1953 |
| 2,820,081 | Daley et al. | Jan. 14, 1958 |
| 2,836,643 | Sindel | May 27, 1958 |
| 2,889,389 | Tamminen | June 2, 1959 |